United States Patent
Partanen et al.

(10) Patent No.: US 7,025,822 B2
(45) Date of Patent: Apr. 11, 2006

(54) ASPHALT MASTIC UTILIZING PETROLEUM REFINERY WASTE SOLIDS

(75) Inventors: John Eric Partanen, Bakersfield, CA (US); Stanley W. Ellis, Bakersfield, CA (US)

(73) Assignee: Sierra Process Systems, Inc., Bakersfield, CA (US)

( * ) Notice: Subject to any disclaimer, the term of this patent is extended or adjusted under 35 U.S.C. 154(b) by 107 days.

(21) Appl. No.: 10/835,238

(22) Filed: Apr. 28, 2004

(65) Prior Publication Data

US 2005/0241529 A1    Nov. 3, 2005

(51) Int. Cl.
*C08L 95/00*     (2006.01)
*C09D 195/00*    (2006.01)

(52) U.S. Cl. .......... 106/284.01; 106/277; 106/284; 106/407; 524/59

(58) Field of Classification Search ........ 106/277, 106/284, 284.01, 407; 524/59
See application file for complete search history.

(56) References Cited

U.S. PATENT DOCUMENTS

| | | | |
|---|---|---|---|
| 1,739,652 A * | 12/1929 | Sadtler | ............ 106/280 |
| 4,437,896 A | 3/1984 | Partanen | |
| 4,931,176 A | 6/1990 | Guinard | |
| 4,994,169 A | 2/1991 | Godino et al. | |
| 5,068,024 A | 11/1991 | Moretta et al. | |
| 5,288,391 A * | 2/1994 | Biceroglu | ............ 208/13 |
| 5,443,717 A | 8/1995 | Scalliet et al. | |
| 5,560,734 A | 10/1996 | McIntosh et al. | |
| 5,788,721 A | 8/1998 | Scalliet et al. | |
| 5,997,168 A | 12/1999 | Harper et al. | |
| 6,074,469 A | 6/2000 | Collins et al. | |
| 6,190,917 B1 | 2/2001 | Barclay et al. | |
| 6,204,421 B1 | 3/2001 | Genssler et al. | |
| 6,207,462 B1 | 3/2001 | Barclay et al. | |
| 6,235,136 B1 | 5/2001 | Kittson et al. | |
| 6,248,140 B1 | 6/2001 | Genssler et al. | |
| 6,277,904 B1 | 8/2001 | Nicholas | |
| 6,293,975 B1 | 9/2001 | Scalliet et al. | |
| 6,310,122 B1 | 10/2001 | Butler et al. | |
| 6,440,205 B1 | 8/2002 | Bailey et al. | |
| 6,444,258 B1 | 9/2002 | Terry | |
| 6,540,822 B1 | 4/2003 | Wates et al. | |
| 6,652,752 B1 | 11/2003 | Ward et al. | |

* cited by examiner

*Primary Examiner*—David Brunsman
(74) *Attorney, Agent, or Firm*—M. Henry Heines; Townsend and Townsend and Crew, LLP

(57) ABSTRACT

An asphalt mastic is prepared by combining comminuted waste solids from a petroleum refinery with liquid asphalt that is either a hot asphalt or an asphalt emulsion. The resulting composition is similar in performance to Trinidad Lake Asphalt and is useful either on its own or as a binder for asphalt-aggregate compositions, in both cases optionally in combination with polymeric additives that are common in the asphalt industry.

33 Claims, No Drawings

ASPHALT MASTIC UTILIZING PETROLEUM REFINERY WASTE SOLIDS

BACKGROUND OF THE INVENTION

1. Field of the Invention

This invention resides in asphalt technology and asphalt formulations, and also in waste management, particularly in connection with petroleum refinery operations.

2. Description of the Prior Art

As one of the world's greatest natural resources, petroleum is the source of a vast array of substances and materials used by consumers and industry alike. The petroleum refining industry has long served as the lifeblood of regions and economies worldwide and contributed to the standards of living currently enjoyed by consumers around the world. In addition to its many benefits to industry, commerce, and society, of course, petroleum refining generates large amounts of waste at various stages of its operations and in a variety of forms. These include wastewater sludges, tank bottoms, solids from slop oil emulsions, and sludges from separation units. The original means of disposing of these wastes, particularly those involving solids, was by landfill, either at the refinery itself or in commercial landfills, or by incineration, or both. Concerns about the environment and about the presence of toxic materials in soil and water have drawn public attention to many industrial and manufacturing operations, however, ultimately leading to the enaction in 1984 of the Hazardous and Solid Waste Amendments to the Resource Conservation and Recovery Act (RCRA).

In 1990, the Environmental Protection Agency implemented these Amendments by officially listing refinery wastes as hazardous wastes, assigning hazardous waste numbers to specified wastes such as dissolved air flotation (DAF) float (which includes up to 10% solids), slop oil emulsion solids, heat exchanger cleaning bundle sludge, API separator sludge, and leaded tank bottoms. The EPA imposed restrictions on the land disposal of these materials, prohibiting the disposal of these materials in landfills unless the materials were treated to reduce their hazardous constituents to extremely low concentrations or unless the landfill was specifically sanctioned by the EPA as one that ensured no migration of the hazardous constituents for as long as they remained hazardous. Other wastes that were soon added to the list were primary and secondary sludges from emulsified oil/water/solids separators and from tanks, impoundments, ditches, sumps and stormwater units, induced air flotation (IAF) units, and DAF units. The primary sludges are those collected by gravitational separation, while secondary sludges are those collected by physical or chemical separation. Solids from even more wastes are continually being added to the list.

These wastes are formed in large quantities in the typical refinery. At one refinery in northern California, waste solids are generated at a rate of 120 bags per day, each bag weighing 500 to 1,000 pounds, with a cost of disposal reaching $700.00 per ton. To lower this cost as well as satisfy the requirements imposed by the EPA, the industry has developed a variety of methods for waste processing and utilization. These include reclaiming useful oil from the wastes by thermal desorption, solvent extraction, and other physical and chemical processes, reintroducing the waste to the refinery as fuel, transporting the waste to an unrelated operation as fuel, and incineration either at the refinery or off-site. Many of these processes are costly, however, and many raise further concerns including the release of incineration products or volatilized substances into the atmosphere. In addition, the advanced refining technology continually being developed by the petroleum industry enables refiners to utilize lower grades of crude oil, generating even higher levels of waste.

The need for cost-effective waste disposal or utilization thus becomes increasingly critical to the petroleum industry as well as to the environment and to human health.

Of further relevance to the background of the present invention is a naturally occurring asphalt known as Trinidad Lake Asphalt, commonly referred to by its acronym TLA. This asphalt is mined from a pitch lake in the southwest of Trinidad. The lake, believed to have been discovered by Sir Walter Raleigh in 1595, is the largest commercial deposit of asphalt in the world. In its native form, TLA contains 30% water, which is readily removed by a simple refining process, leaving a molten material with a soluble bitumen content of 53–55% and a fine particulate mineral content of 36–37%. The lake is in a natural basin above a geological formation containing heavy crude oil. As the oil seeps upward, it passes through layers of rock, drawing the minerals from the rock and carrying them with it until it reaches the basin as a suspension of fine mineral particles in the crude oil. Once the oil is in the basin and exposed to the atmosphere, the light ends of the oil evaporate to leave the mineral-impregnated asphalt.

Trinidad Lake Asphalt is noted for its unusually high resistance to stress and environmental conditions, resulting in products that are highly durable with a long life and low maintenance. TLA and TLA-containing materials are particularly useful, for example, for the surfaces of roadways that receive high traffic, such as freeways, bridges, off-ramps, and the like, where they can be used at reduced thicknesses and yet perform at a level that is equivalent or better than that of other asphalts. In many applications, TLA is used as a binder for crushed mineral aggregate, typically ⅜–¾ inch (roughly 1–2 cm) in size, to form Stone Mastic Asphalt. Mastic asphalt in general (also referred to as asphalt mastic) is widely used as a building material in floors, paved areas, decks, and roofing.

A disadvantage of TLA is that it is a natural product from a single source, and while its value is recognized worldwide, the need to package and transport it to the sites of use adds to the cost.

SUMMARY OF THE INVENTION

It has now been discovered that an asphalt-based suspension similar to TLA can be prepared by combining waste solids from a crude oil refining operation, once the solids have been dehydrated and comminuted to a fine particle size, with a liquid asphalt composition. The suspension can be used by itself as a construction material with a wide range of end uses, including applications where asphalt mastics of the prior art are used, or as a binder for stone mastic asphalt. This invention makes effective use of solid wastes from petroleum refineries, wastes that are produced in high quantity at various locations throughout the world and are costly to treat and to dispose of. Since the refineries that generate these wastes are located in many regions of the globe, the present invention offers a sharp reduction in transportation costs relative to TLA. Furthermore, the composition of the suspension and hence its physical properties, notably those attributable to particle size and the relative amounts of particle and liquid asphalt, are capable of being selected and adjusted to meet specific needs and requirements for any given end use. The suspension can also be supplemented by the addition of the additives that are frequently used in conventional asphalt compositions, such as rubber and other polymers, to achieve the same benefits that these additives provide in conventional asphalt compositions. This adds to the utility and versatility of the suspension and of the various products that can be fabricated from the suspension.

This invention thus resides in novel compositions that contain fine particulate solids derived from the waste solids generated by a petroleum refinery operation, suspended in a liquid asphalt. The invention also resides in the cured and/or solidified forms of these compositions, and in further compositions and materials of construction that contain these compositions in combination with other materials such as conventional aggregate materials and/or polymeric additives. Still further, the invention resides in processes for the treatment and disposal of waste solids from a petroleum refinery operation, and in processes for the manufacture of an asphalt-based suspension from these waste solids. These and other features, embodiments, goals, and advantages of the invention will be more evident from the description that follows.

DETAILED DESCRIPTION OF THE INVENTION AND PREFERRED EMBODIMENTS

Waste solids for use in the present invention occur as sludges in various units in a typical petroleum refinery operation. These sludges include, but are not limited to, API separator sludges, sludges from dissolved air flotation systems and induced air flotation systems, slop oil emulsion sludges, tank bottoms, sludges resulting from cleaning heat exchange bundles, crude oil storage tank sediments, clarified slurry oil tank sediments, sludges from in-line filters, and sludges from drainage ditches. A typical sludge will have a solids content in the range of about 1% to about 30%, the liquid component being water, oil or both. The solids in these sludges contain both organic and inorganic material, and can include suspended carbonaceous matter as well as silt, sand, rust, catalyst fines, and clays such as kaolinite, bentonite, illite, and sepiolite clays. Clays when present serve as thickeners and suspending agents for asphalt compositions, in addition to providing benefits similar to those provided by the fines in TLA. The solids in general originate from the geological formations from which the petroleum was extracted, from deteriorating equipment or materials of construction used in the refinery, and from reagents used in the refining process that have become aggregated, polymerized, or otherwise solidified.

The solids can be concentrated or extracted from the sludges by centrifuge, filter presses, belt presses, vacuum filters, or other mechanical dewatering devices, many of which are used in the refineries. The mechanical dewatering means that are most appropriate for a given sludge will depend on the sludge itself. When a centrifuge is used, the centrifuge can be either a vertical disc centrifuge, a horizontal decanter centrifuge, a bowl centrifuge including both single-chamber and multi-chamber types, a tubular centrifuge, an ultracentrifuge, and a multi-phase combination centrifuge, such as that disclosed in U.S. Pat. No. 4,931,176 (Guinard, Jun. 4, 1990). Still further types of centrifuge are known in the art. Vertical disc centrifuges that contain a disc stack that provides multiple setting surfaces and high g forces are most suitable for floating liquid emulsion sludges which are relatively high in oil content with a small particle size. Horizontal axis decanter centrifuges that have a single settling surface and lower g forces are preferred for bottom sludges, which have a low oil content and large particle size.

The water content of the concentrated solids can be reduced further by conventional methods. One such method is thermal desorption, which consists of heating the solids in the presence of a carrier gas or under vacuum. Thermal desorption is commonly performed in either heated rotary dryers or thermal screws, which are screw conveyors or hollow augers that are indirectly heated with hot oil or steam. In a presently preferred practice of the invention, thermal desorption is performed at a temperature of approximately 200–900° F. (93–480° C.). The degree of dehydration is not critical to the invention but will affect subsequent steps such as the ease of mixing the solids with the liquid asphalt composition, since in many embodiments of the invention the mixing step is performed at an elevated temperature at which a large amount of retained water can cause foaming. The optimal degree of dehydration can also be determined by economic considerations, i.e., balancing the cost of a dehydration operation against the benefits to be gained by a particular degree of dryness. When dehydration is performed prior to combining the solids with the asphalt, best results will be obtained in most cases by lowering the water content to 3% by weight or less, preferably 0.5% by weight or less.

Comminution (size reduction) of the solids can be achieved either after drying of the solids (i.e., reduction of the moisture content) or before. In either case, conventional size reduction equipment can be used. Examples are compression devices such as jaw crushers, gyratory crushers, roll crushers, ring-roll mills, ring-ball mills, hammer mills, sledge mills, vibration mills, stamp mills, rod mills, ball mills, pebble mills, and attrition mills. The choice of equipment will depend on the composition of the solids, including their hardness and initial size distribution, on the condition of the solids to be comminuted including whether the size reduction is to be performed wet or dry, and on the intended ultimate use or grade of the final product. These determinations are well within the routine skill of those experienced in the manufacture, formulation and use of asphalt products, or are readily determined by routine experimentation. It is presently preferred to reduce particles to a size whose longest dimension is at most about 600 microns, and most preferably at most about 250 microns, which is equivalent to minus 70 mesh. (All sieve designations in this specification refer to United States Sieve Series.) The term "longest dimension" as used herein refers to linear dimensions, and generally refers to the size of the smallest sieve opening through which the particle will pass in any orientation. For a spherical particle, the longest dimension is the diameter, while for an elongated particle, the longest dimension is the length of the particle.

The liquid asphalt in which the comminuted and dewatered solids are suspended can be derived from native asphalts, rock asphalts, or petroleum asphalts, as well as modified and/or blended asphalts. Petroleum-derived asphalts are preferred. The liquid form of the asphalt can be achieved by heating any asphalt to a temperature above its softening temperature (i.e., liquefied asphalt), or by blending an asphalt with a petroleum distillate fraction such as gas oil, kerosene, naphtha, or any other petroleum-derived oil that is liquid at ambient temperature to achieve a composition known as a cutback asphalt, or by dispersing liquid asphalt in water to form an emulsion. The suspension can thus be designed for use in preparing either hot mix asphalts or cold mix asphalts, and a key factor in selecting between the two is the choice of liquid asphalt. Asphalts that are not diluted with diluents such as hydrocarbons or water to render the asphalt flowable at ambient temperature are used in preparing hot mix asphalts, while asphalts that are liquid at ambient temperatures, such as cutback asphalts and asphalt emulsions, are used in preparing cold mix asphalts. Asphalts for use in hot mix asphalts typically require heating to about 300° F. (about 150° C.) or above to be in flowable liquid form.

For cold mix asphalts, cutback asphalts can be formulated as slow-curing, medium-curing, or rapid-curing, depending on the amount of diluent and the kinematic viscosity of the blended product. Examples of diluents are petroleum-base lube oils, recycled motor oils, recycled motor oil fluxes, petroleum-base lube oil extracts, asphalt fluxes, and tall oil products. Asphalt emulsions generally include an emulsifying agent, which can be either cationic, anionic, or nonionic. Anionic emulsifying agents commonly used in asphalt emulsions are sodium or potassium palmitate, stearate, linoleate, and abietate, and combinations of these. Typical cationic agents are diamines such as N-octadecyl-1,3-propanediamine hydrochloride. Typical nonionic emulsifying agents are nonionic cellulose derivatives. The emulsions are typically prepared in colloid mills. A typical emulsion may contain petroleum asphalt at 50–75% by weight colloidally suspended at 140–200° F. (60–95° C.) in an aqueous phase containing caustic soda or other bases, or acids, and one of the emulsifying agents listed above.

Examples of asphalts suitable for use in this invention are penetration graded asphalts such as those known in the industry as 30–40 pen, 40–50 pen, 50–60 pen, 85–100 pen, and 120–150 pen; asphalt cements such as those known in the industry as AC-5, AC-10, AC-20, AC-30, and AC-40; aged residue asphalts such as those known in the industry as AR-1000, AR-2000, AR-4000, AR-8000, and AR-16,000; and performance graded asphalts such as those known in the industry as PG 58-28, PG 64-22, PG 70-16, PG 70-10, and PG 76-10.

The proportion of waste solids to liquid asphalt in the compositions of this invention is not critical to the invention and can vary depending on the desired grade of the final product and its intended use. In most case, best results will be achieved with compositions in which the waste solids constitute from about 15% to about 65% by weight of the combination of the waste solids and the liquid asphalt, and preferably from about 25% to about 50%. These proportions are determined on a dehydrated basis. The suspension can be formed by conventional mixing methods, preferably with the asphalt component heated to a temperature high enough to permit slurrying to a uniform solids dispersion throughout the asphalt. When forming the suspension at elevated temperature, the heat can also be used to remove any residual water from the suspension and to recover hydrocarbons for use or for recycling back to the refinery for further processing into such products as fuels, lubrication oils, and other common petroleum-derived products. Examples of equipment that can be used to form the suspension are vertical mix tanks equipped with a moderate-to-high-speed vertically suspended mixer, and horizontal mix tanks with a central shaft equipped with paddles, helical coils, or both.

Suspensions in accordance with this invention can be supplemented by the inclusion of rubbers and polymers in general to modify and improve the physical and mechanical performance of the final material, and particularly for increasing stress resistance. Examples of these rubbers and polymers are butyl rubbers, polybutadiene, polyisoprene, polyisobutene, ethylene/vinyl acetate copolymer, polyacrylate, polymethacrylate, polychloroprene, polynorbornene, ethylene/propylene/diene (EPDM) terpolymer, styrene butadiene styrene co-block polymers, styrene isoprene styrene co-block polymers, styrene butadiene polymers, random or block copolymers of styrene and a conjugated diene, ethylene vinyl acetate polymers, low-density ethylene polymers, vinyl acrylic polymers, and low-density acrylic polymers. Recycled tire rubber is widely used and particularly convenient as a polymeric additive. A water-dispersible polymer thickener can also be included. One example is NATROSOL® 250 HR (Aqualon Co., Wilmington, Del., USA), a hydroxyethyl cellulose. When included, these polymers preferably constitute from about 0.5% to about 15% by weight of the final composition.

When used in the formation of an asphalt-aggregate composition, the suspension of waste solids in asphalt is combined with solid particles known in the art as aggregate. Aggregate consists of any hard, inert, and typically mineral material that is included for strengthening purposes, decorative purposes, or both. Examples of aggregate are sand, gravel, crushed stone, coral, marble, and slag. When present, the aggregate typically constitutes from about 20% to about 97% by weight of the composition. In cold mix asphalts, the aggregate preferably constitutes from about 20% to about 90% of the mixture, and in hot mix asphalts, the aggregate preferably constitutes from about 90% to about 97% of the mixture.

In one implementation of the invention as presently contemplated, the waste solids are wet ground to minus 70 mesh (below 210 microns), then added to the asphalt at approximately 200° F. (93° C.) to form a slurry. The slurry is then heated to 250–300° F. (120–150° C.) and pumped to an atmospheric distillation tower to flash off the water which can be collected and recycled for wet grinding of fresh solids. The dehydrated slurry is then heated to 500–550° F. (260–290° C.) and pumped to a vacuum tower operating at 30 torr to volatilize gas oils, which are then cooled and available for sale to refineries as feed stock. The material at the bottom of the vacuum tower is a mastic asphalt in accordance with the present invention. This mastic asphalt can be cooled to 350–400° F. (175–205° C.) and pumped at that temperature to agitated storage tanks. Mastic asphalts prepared in this manner can be used in the construction of stone mastic asphalt pavements, pond liners, roof coatings, and flooring.

In a second presently contemplated implementation of the invention, a suspension in accordance with the invention is used for the preparation of a cold mix asphalt from recycled asphalt pavement (RAP). This reclaimed material lacks the fines that impart beneficial qualities to mineral-filled asphalts, and is suitable for use in hot-mix asphalt pavements. Beneficial use is made of the material by crushing and screening it to less than one-half inch (1.3 cm), or preferably less than three-eighths inch (0.95 cm) in size, then supplementing it with the waste solids described above from petroleum refinery operations, and adding a slow-curing asphalt emulsion, also as described above. This produces a composition useful as a cold mix asphalt composition. In preferred embodiments, this composition contains RAP at a weight percent within the range of 5 to 99, solid refinery wastes at a weight percent within the range of 1 to 10 (on a dry basis), and the asphalt emulsion as the balance. This composition is used as a paving material by first compacting the material and then allowing sufficient time for the water to evaporate.

In a third presently contemplated implementation of this invention, a suspension in accordance with the invention is used for the preparation of a slurry seal for asphalt pavements. Waste solids that are dewatered and comminuted as described above are resuspended in water to form a thick slurry in which the solids constitute from 15% to 30% by weight, and the slurry is combined with an asphalt emulsion at a slurry:emulsion ratio of 1:1 to 1:10. The resulting composition is useful as a seal coat or a spray-applied surface seal for asphalt pavements.

When the invention is used in the formation of hot mix asphalts, the hot mixes can be prepared in conventional hot mix plants, including batch plants and drum mix drier plants. These plants include a rotary drum into which the sieved aggregate, recycled asphalt pavement, or both, is introduced and heated. Heating is achieved by a large natural gas or diesel-fired burner. The aggregate and recycled asphalt pavement is rotated around the flame as the drum rotates. In a batch-type plant, the heated aggregate or recycled asphalt pavement (or both) is placed in a large pugmill together with the dehydrated centrifuge waste solids and the additives such as polymer or recycled tire rubber. The entire combination is milled until a uniform mixture is achieved. In drum mix drier plants, the asphalt binder and additives can be introduced directly into the rotating drum itself, and mixing occurs in the drum. Once the mixes are uniform, they can be conveyed to heated storage silos for loading into transport trucks, or directly into transport trucks, particularly when the mixes are prepared in batch-type plants.

The following examples are offered by way of illustration, and are not intended to limit or define the invention in any manner. Unless otherwise stated, all percents in these examples are by weight and all proportions expressed as parts are parts by weight.

EXAMPLE 1

This example illustrates the preparation of an asphalt mastic from centrifuge waste solids and an asphalt emulsion in accordance with the invention, supplemented with recycled tire rubber.

A slurry of centrifuge waste solids from a petroleum refinery containing 42.45% solids and 56.60% water was placed in a high-speed vertical suspended mixer. To the slurry were added nonylphenol surfactant to a concentration of 0.5 percent. The resulting dispersion had a residue content of 22%, determined by evaporation, and a viscosity of 273,920 cps measured by a Brookfield viscosimeter at 0.5 rpm with a V-72 vane spindle. The dispersion was slowly added to SS-1h, a slow-setting anionic asphalt emulsion, and mixing was performed at moderate speed. Once the mixture was uniform, the NATROSOL 250HR (hydroxyethyl cellulose water-dispersible thickener) was slowly added. Moderate agitation was continued until the hydroxyethyl cellulose swelled, thickened, and was dispersed. Granulated recycle rubber tire sized to minus 30 mesh was then added, mixed in with moderate agitation until uniformly dispersed, and anionic styrene butadiene latex rubber was added, again with moderate agitation until a uniform mixture was formed as the mastic. The mastic had a residue of 57% and a viscosity of 21,400 cps measured as above. The composition of the mastic was 78.00% SS-1h asphalt emulsion, 11.50% centrifuge waste solids, 6.70% recycled tire rubber, 3.00% styrene butadiene latex rubber, and 0.80% NATROSOL 250 HR.

The mastic was found to be in compliance with specifications for ASTM D-1227 Type III Roof Coatings, and was also found to be suitable as a spray-applied, squeegee-applied, or brush-applied non-sanded asphalt parking lot sealcoat.

EXAMPLE 2

This example illustrates the preparation of a sanded asphalt mastic from the asphalt mastic of Example 1.

An asphalt mastic prepared as in Example 1 was diluted with water at a weight ratio of 85:15 (emulsion:water) and mixed until uniform. Sand at minus 16 mesh (1.19 mm maximum) was then added with further mixing. The resulting mixture contained 39.78% SS-1h asphalt emulsion, 5.87% centrifuge waste solids, 3.41% tire rubber, 1.53% styrene butadiene latex rubber, 0.41% NATROSOL 250 HR, 9.00% water, and 40.00% sand. The residue by evaporation was 69.97%.

The sand-supplemented mastic was found to perform as a satisfactory spray-applied, squeegee-applied, or brush-applied sanded asphalt parking lot sealcoat after further dilution with 15% water. The mastic as applied to asphalt pavement had a residue of 59.48% and was comprised of 33.81% SS-1h asphalt emulsion, 4.99% centrifuge waste solids, 2.90% tire rubber, 1.30% styrene butadiene latex rubber, 0.35% NATROSOL 250 HR, 22.65% water, and 34.00% sand. The composition of the cured sealcoat was 34.11% petroleum asphalt, 1.85% centrifuge waste solids, 4.88% tire rubber, 1.41% styrene butadiene latex rubber, 0.59% NATRASOL 250 HR, and 57.16% sand.

EXAMPLE 3

This example illustrates the preparation of a cold mix asphalt-aggregate composition using the mastic of Example 1 and a mineral aggregate.

An asphalt mastic prepared as in Example 1 was diluted with 4.13% water, and Type II slurry seal mineral aggregate, crushed and sieve-sized, was added to a concentration of 71.13%. The resulting mixture was mixed until uniform, then tested after curing to constant weight and found to be satisfactory as a Type II slurry seal coating for asphalt pavement. Prior to curing, the mixture consisted of 19.30% SS-1h asphalt emulsion, 2.85% centrifuge waste solids, 1.66% tire rubber, 0.74% styrene butadiene latex rubber, 0.19% NATROSOL 250 HR, 4.13% water, and 71.13% Type II slurry seal. After curing, the mixture consisted of 13.51% asphalt, 0.74% centrifuge waste solids, 1.94% tire rubber, 0.56% styrene butadiene latex rubber, 0.22% NATROSOL 250 HR, and 83.03% Type II slurry seal.

EXAMPLES 4 AND 5

These examples illustrate further cold mix asphalts utilizing the same asphalt as Examples 3 but recycled asphalt pavement as the aggregate.

The formulation procedure for both of these examples was as follows. Recycled asphalt pavement millings sized to minus ⅜-inch was combined with damp centrifuge waste solids and an SS-1h asphalt emulsion, and in one example recycled tire rubber sized to minus 30 sieve size was included as well. In each case, the combined components were mixed at room temperature until uniform, then placed in a cylindrical metal mold measuring 4 inches (10.2 cm) in diameter and 3 inches (7.6 cm) in height, and compacted in the mold with a Marshall compaction hammer. The compacted mixture was allowed to cure in the mold for 24 hours, then removed and placed in an oven at 100° F. (37.8° C.) for 48 hours. The cured compact was then allowed to cool to room temperature, and once cooled was tested for compressive strength and displacement, or flow, using a standard Marshall testing apparatus as specified by AASHTO test method T-245.

The proportions of the components of each composition as cured and the test results are shown in Table I below.

TABLE I

Cold Mix Compositions and Test Results

| | Cold Mix Composition as Cured | | | | Cured Product | |
|---|---|---|---|---|---|---|
| | | | Binder | | | |
| Example | Aggregate (%) | Rubber (%) | Waste Solids (%) | Asphalt (%) | Marshall Stability (lb) | Marshall Flow (in) |
| 4 | 92.863 | 1.043 | 0.46% | 5.63% | 5,508 | 48 |
| 5 | 93.9 | 0 | 0.46 | 5.63 | 6,460 | 52 |

EXAMPLES 6 THROUGH 13

These examples illustrate the preparation of a series of hot mix asphalt pavement mixtures containing centrifuge waste solids in accordance with the invention. The binder used in each mixture was petroleum asphalt, the aggregate was recycled asphalt pavement, and several mixtures included recycled tire rubber.

The mixtures were each prepared by the following procedure. The aggregate was prepared by drying a sample of recycled asphalt pavement millings and sieve sizing the dried millings to minus ⅜-inch. The sized millings were heated to 300° F. (149° C.), then for those mixtures containing tire rubber, minus 30 mesh recycled tire rubber was added and the combination was mixed until uniform. Separately, the binder was prepared by combining AR-8000 petroleum asphalt with centrifuge waste solids, which had been dehydrated at 325° F. (163° C.). The aggregate/rubber mixture was combined with the binder, and the entire mixture was mixed at 300–325° F. (149–163° C.) until uniform.

The mixture was then placed in a cylindrical mold measuring 4 inches (10.2 cm) in diameter and 3 inches (7.6 cm) in height, and compacted with a Marshall compaction hammer. The compact was then allowed to cool to room temperature, then tested for compressive strength and displacement or flow using a standard Marshall testing apparatus as specified by AASHTO test method T-245, at 140° F. (60° C.).

The proportions of the components of each of the various mixtures and the test results are shown in Table II below.

EXAMPLES 14 THROUGH 17

These examples illustrate the preparation of another series of hot mix asphalt pavement mixtures containing centrifuge waste solids in accordance with the invention. The aggregate used in this series was a combination of 85 parts by weight recycled asphalt pavement millings (minus ½ inch) and 15 parts by weight dense graded aggregate, the latter having the following composition:

TABLE III

Dense Graded Aggregate Size Distribution

| Sieve | Percent Passing | Specification |
|---|---|---|
| ½ inch | 100 | 100 |
| ⅜ inch | 90.2 | 90 to 100 |
| #4 | 69.8 | 60 to 80 |
| #8 | 51.6 | 40 to 65 |
| #30 | 24.2 | 16 to 38 |
| #80 | 7.6 | 4 to 20 |
| #200 | 1.7 | 2 to 10 |

The mixtures were prepared by first heating the aggregate mixture to 300–325° F. (149–163° C.), then combining the heated aggregate with granulated recycled tire rubber (minus 30 mesh) and a binder that had been prepared by combining AR-8000 petroleum asphalt with dehydrated centrifuge waste solids. In one case, the mixture was prepared without the tire rubber. Each mixture was then mixed at 300–325° F. (149–163° C.) until uniform.

The mixture was then placed in a cylindrical mold measuring 4 inches (cm) in diameter and 3 inches (cm) in height, and compacted with a Marshall compaction hammer. The compact was then allowed to cool to room temperature, and

TABLE II

Hot Mix Compositions and Test Results

| | Hot Mix Composition Prior to Cure | | | Cured Product | |
|---|---|---|---|---|---|
| Example | Aggregate (%) | Rubber (%) | Binder--Asphalt/Solids (%--parts/parts) | Marshall Stability (lb) | Marshall Flow (0.01 in) |
| 6 | 93 | 1 | 6 -- 67.5/32.5 | 3,827 | 25.5 |
| 7 | 94 | 1 | 5 -- 67.5/32.5 | 4,575 | 19 |
| 8 | 95 | 1 | 4 -- 67.5/32.5 | 5,118 | 19 |
| 9 | 93 | 1 | 6 -- 67.5/32.5 | 3,440 | 19 |
| 10 | 94 | 1 | 5 -- 67.5/32.5 | 3,471 | 19 |
| 11 | 95 | 1 | 4 -- 67.5/32.5 | 4,855 | 19 |
| 12 | 94 | 0 | 6 -- 67.5/32.5 | 5,411 | 19 |
| 13 | 95 | 0 | 5 -- 67.5/32.5 | 3,382 | 19 | the cooled compact was tested for compressive strength and displacement or flow using a standard Marshall testing apparatus as specified by AASHTO test method T-245, at 140° F. (60° C.).

The proportions of the components of each of the various mixtures and the test results are shown in Table IV.

TABLE IV

Hot Mix Compositions and Test Results

|  | Hot Mix Composition Prior to Cure | | | Cured Product | |
| --- | --- | --- | --- | --- | --- |
|  |  |  |  | Marshall | Marshall |
| Example | Aggregate (%) | Rubber (%) | Binder--Asphalt/Solids (%--parts/parts) | Stability (lb) | Flow (0.01 in) |
| 14 | 91 | 1 | 8 -- 67.5/32.5 | 1,296 | 11.5 |
| 15 | 90.5 | 1 | 8.5 -- 67.5/32.5 | 2,018 | 18 |
| 16 | 90 | 1 | 9 -- 67.5/32.5 | 1,720 | 15 |
| 17 | 91 | 0 | 9 -- 67.5/32.5 | 1,925 | 14.5 |

EXAMPLES 18 AND 19

These examples illustrate methods for dehydrating centrifuge waste solids and combining the dehydrated solids with different liquid asphalt compositions to form asphalt binders. Using industry-standard tests, the binders as formed are compared with the binders after heating in a rolling thin film oven according to an industry-standard procedure and with the binders after aging in a heated pressure aging vessel, also according to an industry-standard procedure.

Centrifuge waste solids were obtained from a continuous industrial centrifuge in a dewatering unit at a petroleum refinery. The waste solids were damp, containing approximately 20% to 23% water, and 25% to 30% high molecular weight hydrocarbons, i.e., those with boiling points in excess of 100° C. The solids were placed in an oven at 110° C. for 24 hours, then ground with a mortar and pestle to a fine black powder. The solids were then divided on a #70 U.S. standard sieve (210 micron openings). The material not passing through the sieve was ground further until small enough in size to pass.

To form the binder, the dehydrated and sieved solids were combined with one of two liquid asphalts and mixed at 175° C. for 15 minutes. The first liquid asphalt (Example 18) was PG 64-22 petroleum asphalt and the second liquid asphalt (Example 19) was 50–60 penetration petroleum asphalt modified with the addition of recycled motor oil flux at 2% by weight. Each mixture was then allowed to cool to 140° C. with further mixing, then sampled and tested. A second sample from each mixture was heated in a rolling thin film oven in accordance with AASHTO T-240 at 163° C. for 85 minutes and tested, and a third sample from each mixture was aged in a pressure aging vessel according to AASHTO PP1 at 100° C. for 20 hours and tested.

The tests and results are shown in Table V.

TABLE V

Binder Composition Test Results

| Test Name | Test Code | Example 18 | Example 19 |
| --- | --- | --- | --- |
| Original Asphalt Binder: | | | |
| Brookfield Viscosity at 135° C., cps | ASTM D-4402 | 1,237.5 | 3,163 |
| Brookfield Viscosity at 160° C., cps | ASTM D-4402 | 400.0 | 992 |
| Absolute Viscosity at 60° C., ps | AASHTO T-202 | 7,055 | |
| Penetration at 25° C., dmm | AASHTO T-49 | 52 | 35 |
| Approximate Smoke Point, ° C. | AASHTO T-48 | 160 | |
| Softening Point, ° C. | AASHTO T-53 | | 60 |
| COC Flash Point, ° C. | AASHTO T-48 | 260 | 238 |
| Ductility at 25° C. | AASHTO T-21 | 22 | 15.5 |
| Specific Gravity at 25° C. | AASHTO T-228 | 1.1659 | 1.2106 |
| Dynamic Shear G*/sin δ, 10 rads/sec, 70° C. | AASHTO TP-5 | 1.0127 | 1.1278 |
| Residue From Rolling Thin Film Oven: | | | |
| Brookfield Viscosity at 135° C., cps | ASTM D-4402 | 5,900 | 7,696 |
| Absolute Viscosity at 60° C., ps | AASHTO T-202 | 115,119 | |
| Absolute Viscosity Ratio, A/O | AASHTO T-24- | 16.33 | |
| Penetration at 25° C., dmm | AASHTO T-49 | 14 | |
| % Retained Penetration, A/O × 100 | AASHTO T-240 | 26.92 | 51.43 |
| Mass Loss on Heating, % | AASHTO T-240 | 2.754 | 0.91 |
| Dynamic Shear G*/sin δ, 10 rads/sec, 70° C. | AASHTO TP-5 | 12.028 | 4.1709 |
| Residue From Pressure Aging Vessel: | | | |
| Dynamic Shear G*/sin δ, 10 rads/sec, 70° C. | AASHTO TP-5 | 3.5991 | 3.8714 |
| Stiffness, 0° C. | AASHTO TP-3 | 142 | 168 |
| m-Value, 0° C. | AASHTO TP-3 | 0.370 | 0.366 |

Both asphalt binders (Examples 18 and 19) were found to comply with specifications for PG (Performance Grade) 70-10 asphalt binder.

EXAMPLES 20, 21 AND 22

These examples are further illustrations of hot mix asphalt mixtures in accordance with the present invention. The aggregate used in these mixtures was entirely minus ½-inch mineral aggregate as set forth in Table III, and the remaining components were the same as those of Examples 14 through 16. Using the same formulation and test procedures described above in Examples 14 through 16, the proportions of the components and the test results are shown in Table VI.

TABLE VI

Hot Mix Compositions and Test Results

| | | | | Cured Product | |
| --- | --- | --- | --- | --- | --- |
| | Hot Mix Composition Prior to Cure | | | Marshall | Marshall |
| Example | Aggregate (%) | Rubber (%) | Binder--Asphalt/Solids (%--parts/parts) | Stability (lb) | Flow (0.01 in) |
| 20 | 90.9 | 1.1 | 8 -- 67.5/32.5 | 946 | 14 |
| 21 | 90.4 | 1.1 | 8.5 -- 67.5/32.5 | 955 | 12.5 |
| 22 | 89.9 | 1.1 | 9 -- 67.5/32.5 | 1,179 | 13 |

EXAMPLES 23, 24 AND 25

These examples are still further illustrations of hot mix asphalt mixtures in accordance with the present invention. The components of these mixtures were the same as those of Examples 20, 21, and 22, but the waste solids and the liquid asphalt were added separately rather than combined first and added as a prepared mixture. Thus, the dehydrated and recycled centrifuge waste solids were added directly to the heated mixture of mineral aggregate and recycled tire rubber, followed by addition of the liquid asphalt. All other procedures were the same, and the proportions of the components and the test results are shown in Table VII.

TABLE VII

Hot Mix Compositions and Test Results

| | | | | | Cured Product | |
| --- | --- | --- | --- | --- | --- | --- |
| | Hot Mix Composition Prior to Cure | | | | Marshall | Marshall |
| Example | Aggregate (%) | Rubber (%) | Waste Solids (%) | Asphalt (%) | Stability (lb) | Flow (0.01 in) |
| 23 | 90.7 | 1.1 | 3.16 | 5.0 | 993 | 12 |
| 24 | 90.1 | 1.1 | 3.18 | 5.5 | 1,150 | 11.5 |
| 25 | 89.7 | 1.1 | 3.19 | 6.0 | 1,036 | 11.5 |

EXAMPLES 26, 27 AND 28

These examples are still further illustrations of hot mix asphalt mixtures in accordance with the present invention. The components of these mixtures were the same as those of Examples 20, 21, and 22, except that no tire rubber was included in these mixtures. Using the same formulation and test procedures described above in Examples 14 through 16, the proportions of the components and the test results are shown in Table VIII.

TABLE VIII

Hot Mix Compositions and Test Results

| Example | Hot Mix Composition Prior to Cure | | Cured Product | |
|---|---|---|---|---|
| | Aggregate (%) | Binder--Asphalt/Solids (%--parts/parts) | Marshall Stability (lb) | Marshall Flow (0.01 in) |
| 26 | 92 | 8 -- 67.5/32.5 | 1,378 | 12 |
| 27 | 91.5 | 8.5 -- 67.5/32.5 | 1,527 | 12.5 |
| 28 | 91 | 9 -- 67.5/32.5 | 1,660 | 13 |

EXAMPLES 29, 30 AND 31

These examples are still further illustrations of hot mix asphalt mixtures in accordance with the present invention. The components of these mixtures were the same as those of Examples 26, 27, and 28, but the waste solids and the liquid asphalt were added separately rather than combined first and added as a prepared mixture. Thus, the dehydrated and recycled centrifuge waste solids were added directly to the heated mixture of mineral aggregate and recycled tire rubber, followed by addition of the liquid asphalt. All other procedures were the same, and the proportions of the components and the test results are shown in Table IX.

TABLE IX

Hot Mix Compositions and Test Results

| Example | Hot Mix Composition Prior to Cure | | | Cured Product | |
|---|---|---|---|---|---|
| | Aggregate (%) | Waste Solids (%) | Asphalt (%) | Marshall Stability (lb) | Marshall Flow (0.01 in) |
| 29 | 90.7 | 3.16 | 5.0 | 1,539 | 17.5 |
| 30 | 90.1 | 3.18 | 5.5 | 1,577 | 14.5 |
| 31 | 89.7 | 3.19 | 6.0 | 1,617 | 13 |

The foregoing is presented primarily for purposes of illustration. Those skilled in the asphalt and petroleum refinery arts will readily recognize that numerous variations, modifications, and substitutions can be made without departing from the spirit and scope of the invention.

What is claimed is:

1. An asphalt mastic composition comprising:
    (a) waste solids from a crude oil refining operation, comminuted to particles whose longest dimension is a maximum of about 600 microns, and
    (b) a liquid asphalt composition.
2. The asphalt mastic composition of claim 1 wherein said waste solids constitute from about 15% to about 65% by weight of said waste solids and said liquid asphalt composition combined, said waste solids on a dehydrated basis.
3. The asphalt mastic composition of claim 1 wherein said waste solids constitute from about 25% to about 50% by weight of said waste solids and said liquid asphalt composition combined, said waste solids on a dehydrated basis.
4. The asphalt mastic composition of claim 1 wherein said waste solids are comminuted to particles whose longest dimension is a maximum of about 250 microns.
5. The asphalt mastic composition of claim 1 wherein said waste solids are solids recovered from a member selected from the group consisting of API separators, slop oil emulsions, and tank bottom sludges.
6. The asphalt mastic composition of claim 1 wherein said liquid asphalt composition is an asphalt undiluted with either a hydrocarbon diluent or water.
7. The asphalt mastic composition of claim 1 wherein said liquid asphalt composition is an aqueous asphalt emulsion.
8. The asphalt mastic composition of claim 1 wherein said liquid asphalt composition is cutback asphalt.
9. The asphalt mastic composition of claim 1 further comprising a polymeric additive in an amount effective to increase stress resistance.
10. The asphalt mastic composition of claim 9 wherein said polymeric additive is recycled tire rubber.
11. The asphalt mastic composition of claim 1 wherein said waste solids are the product of a process comprising:
    (i) separating a sludge selected from the group consisting of API separator sludge, slop oil sludge, and tank bottom sludge, by centrifuge into a liquid phase and a wet solids phase,
    (ii) heating said wet solids phase at a temperature and time sufficient to convert said wet solids phase to dehydrated solids having a water content of less than 3% by weight, and
    (iii) comminuting said dehydrated solids to particles whose longest dimension is a maximum of about 600 microns.
12. The asphalt mastic composition of claim 1 which is the product of a process comprising:
    (i) separating a sludge selected from the group consisting of API separator sludge, slop oil sludge, and tank bottom sludge, by centrifuge into a liquid phase and a wet solids phase,
    (ii) wet grinding said wet solids phase to comminute solids therein to particles whose longest dimension is a maximum of about 600 microns,
    (iii) combining said wet solids phase with said liquid asphalt composition to form a slurry, and
    (iii) heating said slurry at a temperature and time sufficient to convert said slurry to an asphalt mastic composition having a water content of less than 3% by weight.
13. An asphalt-aggregate composition comprising:
    (a) an asphalt mastic composition comprising:
        (i) waste solids from a crude oil refining operation, comminuted to particles whose longest dimension is a maximum of about 600 microns, and
        (ii) a liquid asphalt composition, and
    (b) aggregate selected from the group consisting of sand, gravel, crushed stone, coral, marble and slag.
14. The asphalt-aggregate composition of claim 13 wherein said waste solids constitute from about 15% to about 65% by weight of said waste solids and said liquid asphalt composition combined, said waste solids on a dehydrated basis.
15. The asphalt-aggregate composition of claim 13 wherein said waste solids constitute from about 25% to about 50% by weight of said waste solids and said liquid asphalt composition combined, said waste solids on a dehydrated basis.
16. The asphalt-aggregate composition of claim 13 wherein said waste solids are comminuted to particles whose longest dimension is a maximum of about 250 microns.
17. The asphalt-aggregate composition of claim 13 wherein said waste solids are solids recovered from a member selected from the group consisting of API separators, slop oil emulsions, and tank bottom sludges.

18. The asphalt mastic composition of claim 13 wherein said liquid asphalt composition is an asphalt undiluted with either a hydrocarbon diluent or water.

19. The asphalt-aggregate composition of claim 13 wherein said liquid asphalt composition is an aqueous asphalt emulsion.

20. The asphalt-aggregate composition of claim 13 wherein said liquid asphalt composition is cutback asphalt.

21. The asphalt-aggregate composition of claim 13 wherein further comprising a polymeric additive in an amount effective to increase stress resistance.

22. The asphalt-aggregate composition of claim 21 wherein the polymeric additive is recycled tire rubber.

23. The asphalt-aggregate composition of claim 13 wherein said waste solids are the product of a process comprising:
   (i) separating a sludge selected from the group consisting of API separator sludge, slop oil sludge, and tank bottom sludge, by centrifuge into a liquid phase and a wet solids phase,
   (ii) heating said wet solids phase at a temperature and time sufficient to convert said wet solids phase to dehydrated solids having a water content of less than 3% by weight, and
   (iii) comminuting said dehydrated solids to particles whose longest dimension is a maximum of about 600 microns.

24. The asphalt-aggregate composition of claim 13 wherein said asphalt mastic composition is the product of a process comprising:
   (i) separating a sludge selected from the group consisting of API separator sludge, slop oil sludge, and tank bottom sludge, by centrifuge into a liquid phase and a wet solids phase,
   (ii) wet grinding said wet solids phase to comminute solids therein to particles whose longest dimension is a maximum of about 600 microns,
   (iii) combining said wet solids phase with said liquid asphalt composition to form a slurry, and
   (iii) heating said slurry at a temperature and time sufficient to convert said slurry to an asphalt mastic composition having a water content of less than 3% by weight.

25. A process for manufacturing a composition useful as an asphalt mastic, said process comprising:
   (a) separating a waste sludge from a crude oil refining operation into a liquid phase and a wet solids phase,
   (b) heating said wet solids phase at a temperature and time sufficient to convert said wet solids phase to dehydrated solids having a water content of less than 3% by weight,
   (c) comminuting said dehydrated solids to particles whose longest dimension is a maximum of about 600 microns, and
   (d) combining said dehydrated solids thus comminuted with a liquid asphalt composition to form said asphalt mastic.

26. The process of claim 25 wherein said temperature of step (b) is from about 90° C. to about 100° C.

27. A process for manufacturing a composition useful as an asphalt mastic, said process comprising:
   (a) separating a waste sludge from a crude oil refining operation into a liquid phase and a wet solids phase,
   (b) wet grinding said wet solids phase to comminute solids therein to particles whose longest dimension is a maximum of about 600 microns,
   (c) combining said wet solids phase with said liquid asphalt composition to form a slurry, and
   (d) heating said slurry at a temperature and time sufficient to convert said slurry to an asphalt mastic having a water content of less than 3% by weight.

28. The process of claim 27 wherein step (d) comprises:
   (i) heating said slurry to a temperature of from about 120° C. to about 150° C., to vaporize water from said slurry, leaving a dehydrated slurry, and
   (ii) heating said dehydrated slurry to a temperature of from about 250° C. to about 300° C. at a pressure of about 0.1 atmosphere or less to cause discharge of gas oils from said dehydrated slurry.

29. The process of claim 28 further comprising recycling water thus vaporized from said slurry to said wet solids phase of step (b).

30. The process of claim 25 or 27 wherein said waste sludge is used in an amount relative to said liquid asphalt composition that said waste solids constitute from about 15% to about 65% by weight of said asphalt mastic formed in step (d), said waste solids on a dehydrated basis.

31. The process of claim 25 or 27 wherein said waste sludge is used in an amount relative to said liquid asphalt composition that said waste solids constitute from about 25% to about 50% by weight of said asphalt mastic formed in step (d), said waste solids on a dehydrated basis.

32. The process of claim 25 or 27 wherein said waste solids in said asphalt mastic formed in step (d) are particles whose longest dimension is a maximum of about 250 microns.

33. The process of claim 25 or 27 wherein said waste sludge is a sludge selected from the group consisting of API separator sludge, slop oil sludge, and tank bottom sludge.

* * * * *